(12) United States Patent
Hendrix et al.

(10) Patent No.: US 11,417,943 B2
(45) Date of Patent: Aug. 16, 2022

(54) MODULAR MONOPOLE FOR WIRELESS COMMUNICATIONS

(71) Applicant: CommScope Technologies LLC, Hickory, NC (US)

(72) Inventors: Walter Mark Hendrix, Richardson, TX (US); Julian R. Colapietro, McKinney, TX (US); James E. Noel, Parker, TX (US); Michael J. Paulus, Dallas, TX (US)

(73) Assignee: CommScope Technologies LLC, Hickory, NC (US)

( * ) Notice: Subject to any disclaimer, the term of this patent is extended or adjusted under 35 U.S.C. 154(b) by 313 days.

(21) Appl. No.: 15/913,019

(22) Filed: Mar. 6, 2018

(65) Prior Publication Data

US 2018/0254545 A1      Sep. 6, 2018

Related U.S. Application Data

(60) Provisional application No. 62/467,620, filed on Mar. 6, 2017, provisional application No. 62/474,189, filed on
(Continued)

(51) Int. Cl.
*H01Q 1/44* (2006.01)
*H01Q 1/24* (2006.01)
(Continued)

(52) U.S. Cl.
CPC ............. *H01Q 1/246* (2013.01); *H01Q 1/02* (2013.01); *H01Q 1/1242* (2013.01);
(Continued)

(58) Field of Classification Search
CPC .. H01Q 1/246; H01Q 1/1242; H01Q 21/0025; H01Q 1/02; H01Q 9/32; H01Q 21/28; H04W 88/085
See application file for complete search history.

(56) References Cited

U.S. PATENT DOCUMENTS 5,570,546 A  *  11/1996  Butterworth ............ E04H 12/34
                                                     343/890
5,611,176 A  *   3/1997  Juengert ................. A41G 1/001
                                                     428/18
(Continued)

FOREIGN PATENT DOCUMENTS

EP      1401048 A1 *  3/2004   ............. H01Q 1/246
ES      2279397 T3      8/2007

OTHER PUBLICATIONS

Notification of Transmittal of the International Search Report and the Written Opinion of the International Searching Authority, or the Declaration corresponding to International Application No. PCT/US2018/021032 dated Jun. 28, 2018.
(Continued)

*Primary Examiner* — Dimary S Lopez Cruz
*Assistant Examiner* — Bamidele A Jegede
(74) *Attorney, Agent, or Firm* — Myers Bigel, P.A.

(57) ABSTRACT

A modular monopole for wireless communications includes: an antenna module having a floor, a ceiling and a side wall that form an antenna compartment, wherein at least one antenna resides within the antenna compartment; a radio module having a floor, a ceiling and a side wall that form a radio compartment, wherein at least one remote radio unit (RRU) resides within the radio compartment; and a base. The base, the radio module, and the antenna module are arranged in vertically stacked relationship, with the base below the radio module and the antenna module above the radio module.

14 Claims, 14 Drawing Sheets

Related U.S. Application Data on Mar. 21, 2017, provisional application No. 62/475,301, filed on Mar. 23, 2017.

(51) Int. Cl.
| | | |
|---|---|---|
| *H01Q 1/02* | (2006.01) | |
| *H01Q 21/00* | (2006.01) | |
| *H01Q 1/12* | (2006.01) | |
| *H04W 88/08* | (2009.01) | |
| *H01Q 21/28* | (2006.01) | |
| *H01Q 9/32* | (2006.01) | |

(52) U.S. Cl.
CPC ........... *H01Q 21/0025* (2013.01); *H01Q 9/32* (2013.01); *H01Q 21/28* (2013.01); *H04W 88/085* (2013.01)

(56) References Cited

U.S. PATENT DOCUMENTS

| | | | | |
|---|---|---|---|---|
| 5,641,141 | A * | 6/1997 | Goodwin | H01Q 1/12 248/218.4 |
| 5,950,712 | A * | 9/1999 | Gates | F24T 10/40 165/45 |
| 5,995,063 | A * | 11/1999 | Somoza | H01Q 1/12 343/890 |
| 6,094,929 | A * | 8/2000 | Eriksson | H04B 1/036 361/696 |
| 6,173,537 | B1 * | 1/2001 | Davidsson | E04H 12/08 343/890 |
| 6,222,503 | B1 * | 4/2001 | Gietema | H01Q 1/1207 343/700 MS |
| 6,912,408 | B1 * | 6/2005 | O'Neill | H01Q 1/12 343/890 |
| 9,209,523 | B2 * | 12/2015 | Ma | H04W 84/042 |
| 9,433,034 | B2 | 8/2016 | Hendrix et al. | |
| 9,698,477 | B1 * | 7/2017 | Jabara | E04H 12/342 |
| 10,199,712 | B1 * | 2/2019 | Boyle | H01Q 1/1242 |
| 10,347,979 | B1 * | 7/2019 | Boyle | H01Q 1/246 |
| 2002/0151332 | A1 * | 10/2002 | Eddy | H04B 1/18 455/561 |
| 2003/0205021 | A1 * | 11/2003 | Ryan | E04C 3/30 52/834 |
| 2004/0174317 | A1 * | 9/2004 | Dearnley | H01Q 1/1207 343/890 |
| 2004/0192392 | A1 * | 9/2004 | Hoppenstein | H01Q 1/246 455/562.1 |
| 2005/0030250 | A1 * | 2/2005 | Gotti | H01Q 1/246 343/878 |
| 2009/0019816 | A1 * | 1/2009 | Lockwood | E04H 12/02 52/848 |
| 2010/0026604 | A1 * | 2/2010 | Caldwell | H01Q 1/1242 343/890 |
| 2010/0231469 | A1 * | 9/2010 | Kim | H01Q 1/44 343/721 |
| 2010/0315309 | A1 * | 12/2010 | Hager | E04H 12/003 343/872 |
| 2010/0317278 | A1 * | 12/2010 | Novick | F24F 11/0001 62/401 |
| 2012/0014697 | A1 | 1/2012 | Zhao et al. | |
| 2012/0132781 | A1 * | 5/2012 | Kolokotronis | H01Q 1/1235 248/535 |
| 2013/0294738 | A1 * | 11/2013 | Simmons | H02G 15/115 385/135 |
| 2014/0182811 | A1 * | 7/2014 | Hager | H01Q 1/02 165/104.34 |
| 2014/0237909 | A1 * | 8/2014 | Gupta | H01Q 1/1242 52/40 |
| 2015/0013261 | A1 * | 1/2015 | Kolokotronis | B23P 15/00 52/651.07 |
| 2015/0017937 | A1 * | 1/2015 | Colapietro | H05K 7/20127 455/128 |
| 2015/0057047 | A1 * | 2/2015 | Hendrix | H04B 1/40 455/562.1 |
| 2015/0144758 | A1 * | 5/2015 | Kolokotronis | H01Q 1/1242 248/282.1 |
| 2015/0219856 | A1 | 8/2015 | Wang | |
| 2015/0380805 | A1 * | 12/2015 | Arranz | H01Q 9/16 343/793 |
| 2015/0380806 | A1 * | 12/2015 | Wild | H01Q 1/246 343/906 |
| 2016/0119796 | A1 * | 4/2016 | Ho | H01Q 21/29 370/328 |
| 2016/0276817 | A1 | 9/2016 | Wang | |
| 2016/0336641 | A1 * | 11/2016 | DiPiero | F16M 13/02 |
| 2016/0359224 | A1 * | 12/2016 | Mellor | H01Q 3/08 |
| 2016/0365624 | A1 * | 12/2016 | Maley | H01Q 3/06 |
| 2018/0277923 | A1 * | 9/2018 | Kang | H01Q 1/1207 |

OTHER PUBLICATIONS

International Preliminary Report on Patentability corresponding to International Application No. PCT/US2018/021032 dated Sep. 19, 2019.

"Examination Report corresponding to European Application No. 18763219.5 dated Dec. 3, 2020".

"Extended European Search Report corresponding to European Application No. 18763219.5 dated Mar. 9, 2021".

* cited by examiner

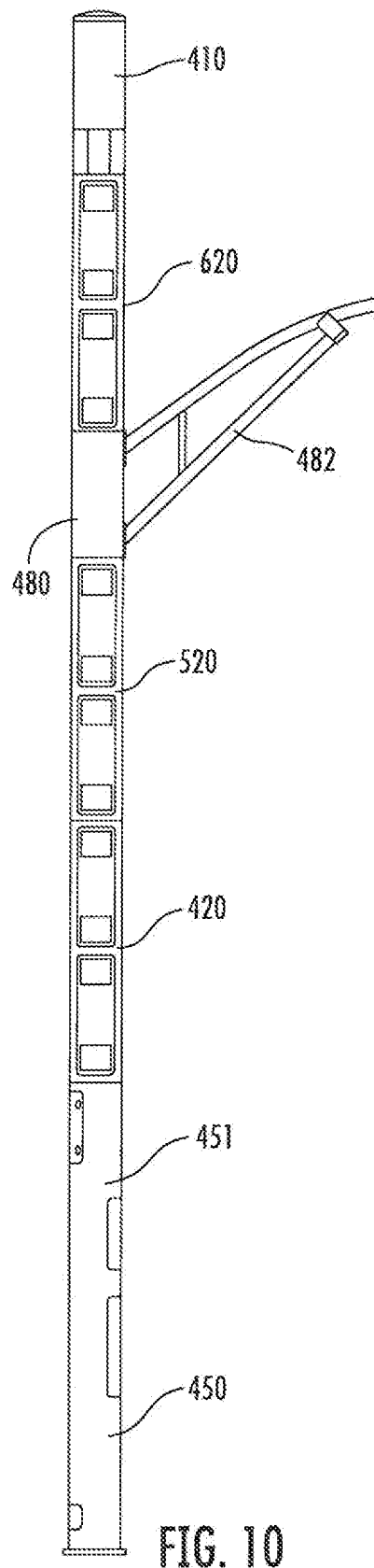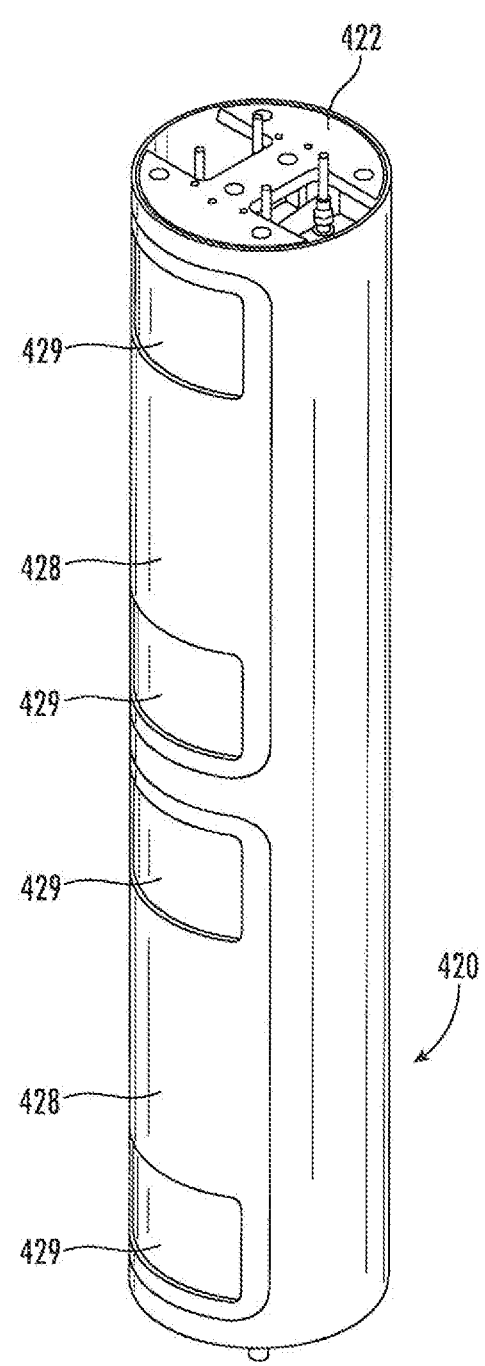
FIG. 10
FIG. 11

MODULAR MONOPOLE FOR WIRELESS COMMUNICATIONS

RELATED APPLICATIONS

The present application claims priority from and the benefit of U.S. Provisional Patent Application Nos. 62/467,620, filed Mar. 6, 2017; 62/474,189, filed Mar. 21, 2017; and 62/475,301, filed Mar. 23, 2017, the disclosure of each of which is hereby incorporated herein by reference in its entirety.

FIELD OF THE INVENTION

The present application is directed generally toward communication antennas, and more particularly to mounting structures for communications antennas.

BACKGROUND

As wireless data service demands have grown, a conventional response has been to increase the number and capacity of conventional cellular Base Stations (Macro-Cells). Such Macro-Cells are typically mounted on antenna towers. A conventional antenna tower has three or four legs on which antennas and supporting remote radio units (RRUs) are mounted. However, in some environments structures known as "monopoles" are used as mounting structures. A typical monopole 10 with antennas 20 mounted on mounting frames 30 is shown in FIG. 1. Monopoles are typically employed when fewer antennas/RRUs are to be mounted, and/or when a structure of less height is required.

In addition, Macro-Cell sites are becoming less available, and available spectrum limits how much additional capacity can be derived from a given Macro-Cell. Accordingly, small cell RRU and antenna combinations have been developed to "fill in" underserved or congested areas that would otherwise be within a Macro-Cell site. Deployment of small cells, particularly in urban environments, is expected to continue to grow. Often such small cell configurations (sometimes termed "metrocells") are mounted on monopoles.

In view of the foregoing, it may be desirable to provide additional monopole arrangements.

SUMMARY

As a first aspect, embodiments of the invention are directed to a modular monopole for wireless communications. The modular monopole comprises: an antenna module having a floor, a ceiling and a side wall that form an antenna compartment, wherein at least one antenna resides within the antenna compartment; a radio module having a floor, a ceiling and a side wall that form a radio compartment, wherein at least one remote radio unit (RRU) resides within the radio compartment; and a base. The base, the radio module, and the antenna module are arranged in vertically stacked relationship, with the base below the radio module and the antenna module above the radio module.

In some embodiments, the base includes a power distribution unit.

In other embodiments, the base includes an air flow unit that helps to direct cooling air into modules stacked above the base.

In further embodiments, the monopole may rely on passive cooling air that enters an equipment module through an air intake section (typically perforated) and exits through an air exit section (also often perforated). In such embodiments, one or more baffles may be present in the module to direct air that has entered through the air intake section to the air exit section.

BRIEF DESCRIPTION OF THE FIGURES

FIG. 10 is a perspective view of a telecommunications pole in the form of a streetlight according to embodiments of the invention.

FIG. 11 is an exploded perspective view of a power module of the pole of FIG. 10.

DETAILED DESCRIPTION

Figure 1:
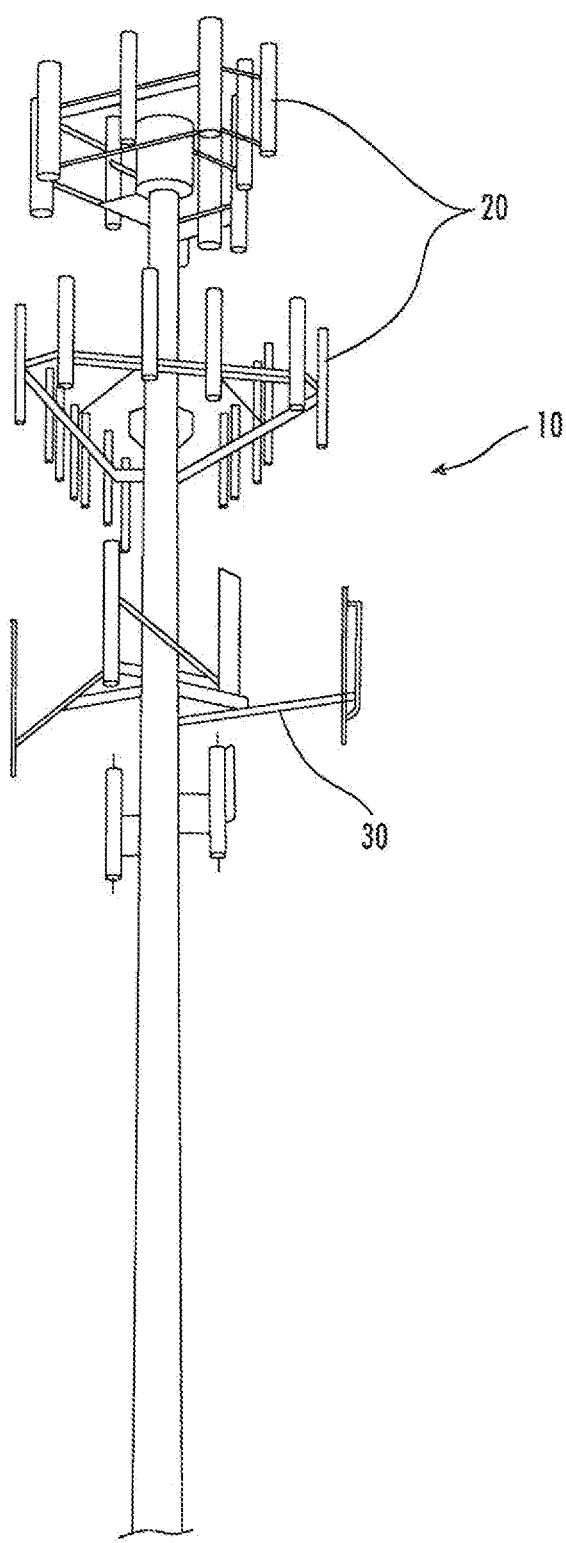
FIG. 1 is front view of a conventional monopole with four antenna frames and accompanying antennas mounted thereon.

The present invention will now be described more fully hereinafter, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used hemin is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The device may be otherwise oriented (rotated 90 degrees or at other orientations) and the spatially relative descriptors used herein interpreted accordingly.

Well-known functions or constructions may not be described in detail for brevity and/or clarity.

Figure 2:
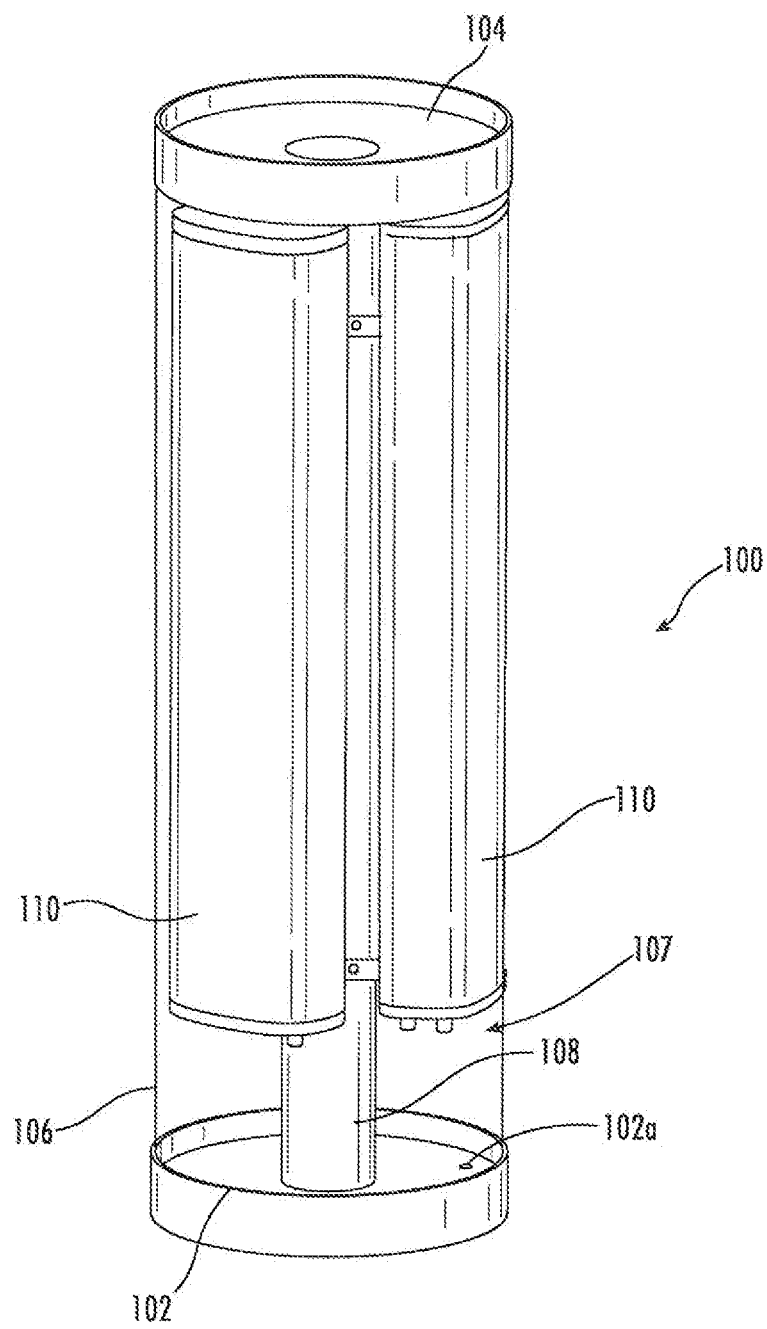
FIG. 2 is a front view of an antenna module for a modular monopole according to embodiments of the invention.
Figure 3:
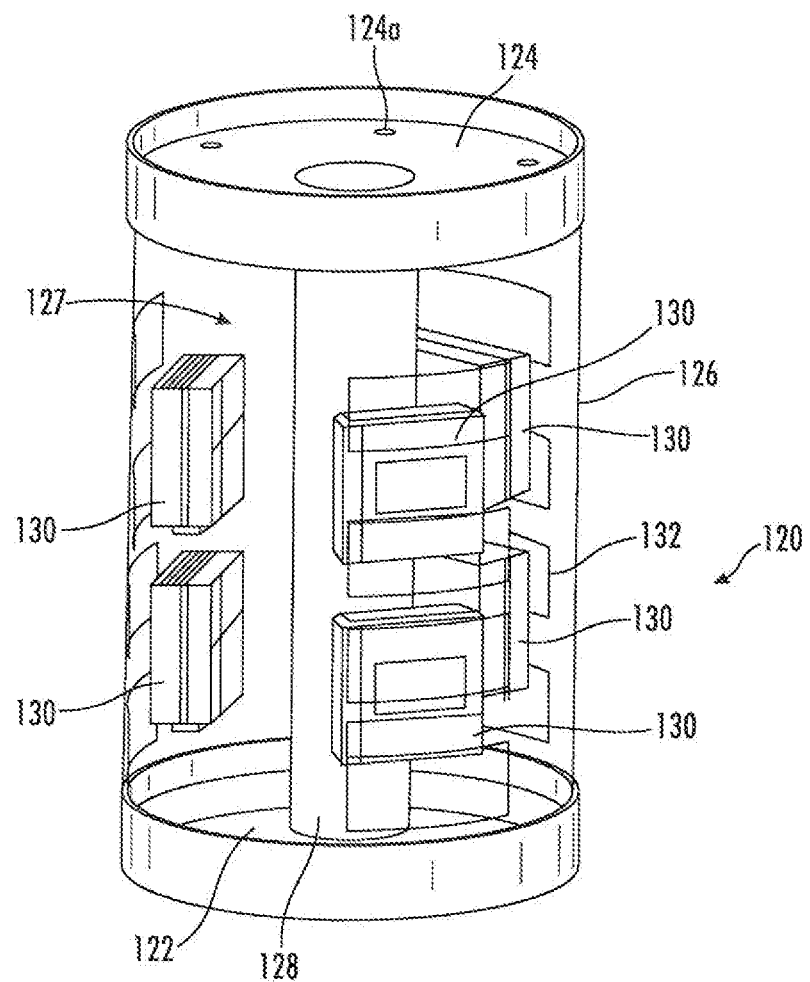
FIG. 3 is a front view of a radio module for a modular monopole according to embodiments of the invention.
Figure 4:
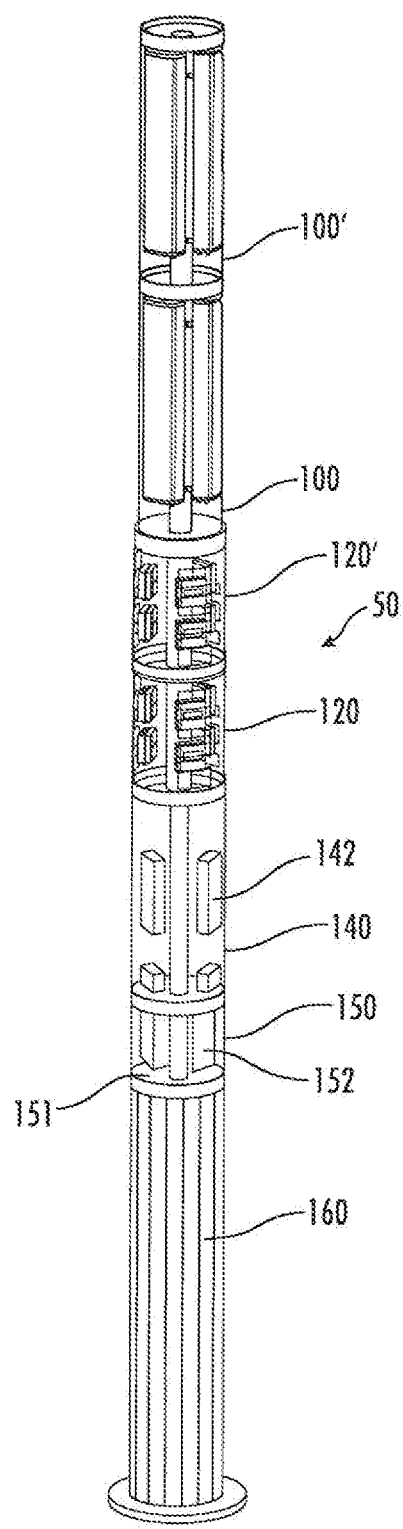
FIG. 4 is a front view of a modular monopole according to embodiments of the invention.

Referring now to FIGS. 2-4, an antenna module for a modular monopole, designated broadly at 100, is shown therein. The antenna module 100 includes a circular floor 102, a circular ceiling 104, and a cylindrical side wall 106 that extends between the floor 102 and the ceiling 104 that form an antenna compartment 107. A hollow post 108 extends through the center of the module 100 between the floor 102 and the ceiling 104. Three antennas 110 are mounted to the post 108 within the side wall 106.

Referring now to FIG. 3, a radio module 120 for a modular monopole is illustrated therein. Similar to the antenna module 100, the radio module 120 includes a circular floor 122, a circular ceiling 124, and a cylindrical side wall 126 that extends between the floor 122 and the ceiling 124 that form a radio compartment 127. A hollow post 128 extends through the center of the module 100 between the floor 122 and the ceiling 124. Six RRUs 130 are mounted to the post 128 within the side wall 126 (typically with an adapter bracket or the like). The side wall 126 may also have vents 132 (which may be perforated patterns of small holes) that can provide the RRUs 130 with ventilation to prevent overheating.

The floors 102, 122, ceilings 104, 124, and posts 108, 128 of the antenna module 100 and the radio module 120 are typically formed of a metallic material, such as steel or aluminum. The side walls 126 of the radio module 120 are typically formed of a metallic material such as aluminum. The side walls 106 of the antenna module 100 are typically formed of a dielectric panel material or a durable fabric, either of which are substantially transparent to radio frequency signals. Exemplary materials include ABS polymer (for a dielectric panel) and high performance polyester microyarn-based cloth (for a durable fabric).

As can be seen from FIGS. 2 and 3, the radio module 120 is typically shorter than the antenna module 100; the radio module 120 may be between about 1.0 and 2.0 feet in height, whereas the antenna module 100 may be between about 3.0 and 6.0 feet in height. The radio module 120 and the antenna module 100 are typically substantially identical in diameter (e.g., between about 5.0 and 10.0 feet in diameter for a typical monopole, and between about 8 and 16 inches in diameter for a typical metrocell pole).

Referring now to FIG. 4, a modular monopole, designated broadly at 50, is shown therein. The monopole 50 is constructed of individual sections, including one or more antenna modules 100 and one or more radio modules 120, along with additional sections. The exemplary monopole 20 shown in FIG. 4 includes two antenna modules 100, 100' stacked vertically at the top of the monopole 20 and two radio modules 120, 120' stacked vertically immediately below the antenna modules 100, 100'. The illustrated monopole 50 also includes another radio module 140, which houses RRUs 142 of a different type and size, below the radio modules 120, 120'. Those skilled in this art will appreciate that RRUs of virtually any configuration may be suitable for inclusion in a radio module.

Still referring to FIG. 4, a distribution module 150 is located below the radio module 140. The distribution module 150 includes enclosures 152 within a distribution compartment 151 in which optical fibers and power conductors from a hybrid trunk cable are broken out for distribution to the RRUs 130, 142. Exemplary enclosures include those discussed in U.S. Patent Publication Nos. 2016/0276817 and 2015/0219856 to Wang, the disclosures of which are hereby incorporated herein. Other configurations for breaking out and distributing optical fibers and power conductors, which may take the form of an enclosure, a fan-out device or pigtail transition device, or the like, may also be employed.

Referring still to FIG. 4, a base 160 is located below the distribution module 150. The base 160 serves as a foundation for the monopole 50. Typically, the base 160 is between about 4.0 and 10.0 feet in height to provide elevation to the components, such as the RRUs 130, 142 and the antennas 110, that perform optimally when located well above the ground.

Each of the radio module 140, the distribution module 150 and the base 160 typically has a diameter that is substantially identical to those of the antenna and radio modules 100, 100', 120, 120', such that the monopole 50 is of substantially constant diameter much like a typical one-piece monopole. Although the modular monopole 50 may be of any height, typically the modular monopole 20 has a height of between about 35 and 70 feet, with the antenna modules 100, 100' being at least 25 to 60 feet off of the ground. Also, the base 160, the distribution module 150 and the radio module 140 typically include hollow posts similar to the posts 108, 128 of the modules 100, 120, such that a central vertical passageway is formed in the center of the monopole 50.

Those skilled in this art will appreciate that other number or types modules may be added to the monopole 50, and some of these modules may be omitted in some embodiments. It is also contemplated that, although the modules are illustrated as being cylindrical, they may take other shapes (e.g., triangular or square), and they may have differing cross-sectional sizes (e.g., the modules may decrease in diameter with increasing height to form an elongated conical or stepped monopole).

The various modules may be secured to each other in many ways. As an example, fasteners may be inserted through holes in the floors and ceilings (see, e.g., holes 124a in the ceiling 124 of the radio module 120 and holes 102a in the floor 102 of the antenna module 100) to secure the modules to each other. Alternatively, the posts of the modules may have a relatively narrowed section at one end that fits within a relatively wider section of the post of the adjacent module. Other mounting techniques may also be employed. As another alternative, a vertical mast (not shown) may extend through the passageway formed by the hollow posts of the various modules (including the posts 128, 108 of the radio and antenna modules 100, 120) to maintain the modules in a stacked relationship.

It is also envisioned that cables for the RRUs 130 and antennas 110 may be routed from the ground through the empty interior passageways formed by the posts 108, 128

(and similar posts in the other modules) into the appropriate modules. In such a configuration, the posts of the various modules would have access holes, slots or the like to enable a trunk cable to be routed from the interior of the posts to the distribution module 150, and for jumper cables to be routed from the distribution module 150 to the RRUs 130 and from the RRUs 130 to the antennas 110. As an example, a trunk cable may be routed from the ground through the base 160 to the enclosures 152 of the distribution module 150. Jumper cables may be routed from the enclosures 152 within the distribution module 150 to the post of the distribution module 150 and to the radio modules 140, 120, 120' for interconnection with the RRUs 142, 130. Additional jumper cables may then be routed from the RRUs 130 into the post 128, then up to the appropriate antenna modules 100, 100' for interconnection with the antennas 110.

Alternatively, a cable may be routed from the ground through passageways in the modules until the cables reach the first module requiring interconnection (e.g., the distribution module 150), and jumper cables can be routed from that module to additional modules through routing holes in the ceilings and floors of the modules.

In some embodiments, one or more of the modules may include features for rotational alignment (e.g., keys and grooves, pins and holes, and the like) to ensure proper relative orientation of the modules. In addition, in some embodiments the posts of the modules may include features (e.g., shims) that ensure that the resulting monopole is vertically straight. Alternatively, some or all of the modules may include leveling features (e.g., set screws, threaded feet, etc.) that can level individual modules to ensure vertical deployment.

Use of modules such as the antenna module 100 and the radio module 120 can enable a manufacturer to "mix and match" modules in the factory to a configuration desired by the end user. The various modules can be packaged as a kit and shipped to the installation site for final assembly. In this manner, no on-site mounting of RRUs, antennas and the like may be required. In addition, some quality testing that is typically performed in the field (e.g., radio frequency (RF) performance testing) may be performed in the factory.

Figure 5:
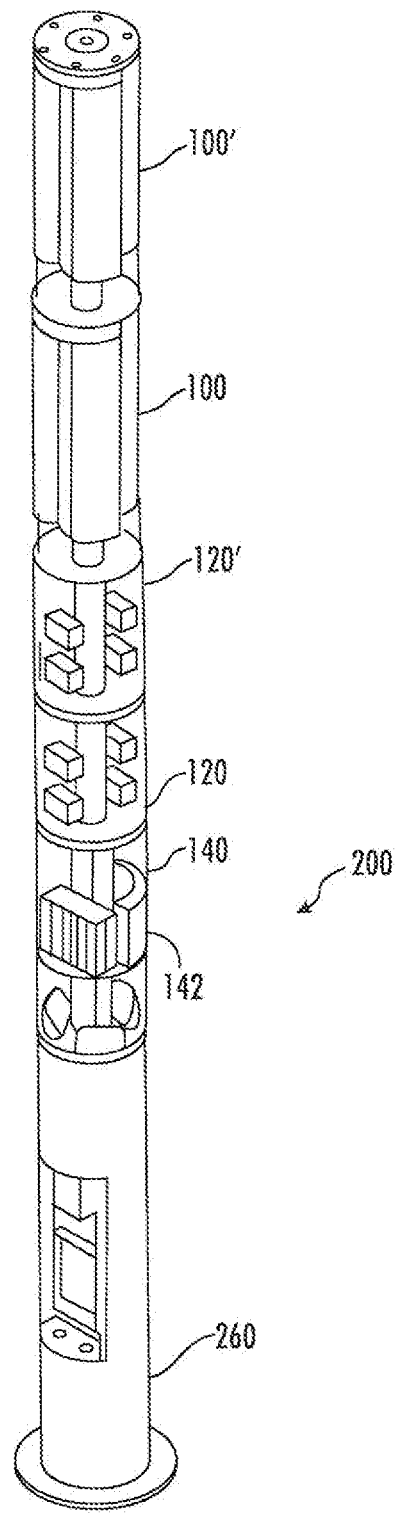
FIG. 5 is a front view of a modular monopole according to embodiments of the invention.
Figure 6:
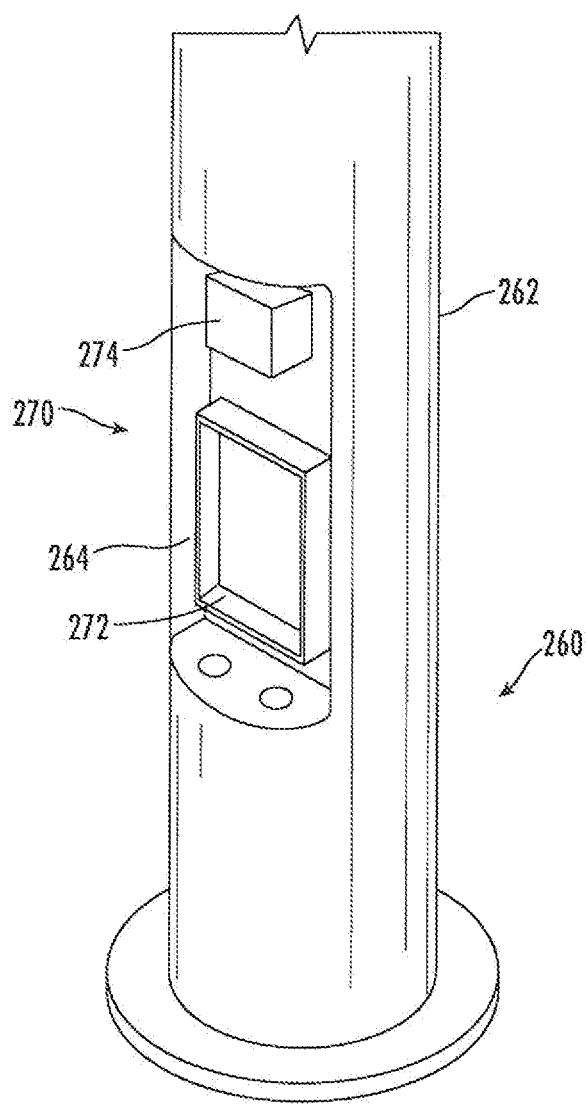
FIG. 6 is a front view of a base section of the modular monopole of FIG. 5 showing a cable distribution unit.

Referring now to FIGS. 5 and 6, a modular monopole, designated broadly at 200, is shown therein. Like the monopole 50, the monopole 200 is constructed of individual sections, including one or more antenna modules and one or more radio modules, along with optional additional sections. The exemplary monopole 200 shown in FIG. 5 includes two antenna modules 100, 100' stacked vertically at the top of the monopole 200, two radio modules 120, 120' stacked vertically immediately below the antenna modules 100, 100', and another radio module 140 of a different type and size, below the radio modules 120, 120'. A base section 260 is located below the radio module 140. The antenna modules 100, 100' and radio modules 120, 120', 140 are as described above.

The base section 260 is located beneath the radio module 140 and provides a solid foundation for the remaining modules of the monopole 200 via side walls 262. The base section 260 may be substantially hollow and/or may include a hollow post similar to the posts 108, 128 of the modules 100, 120, such that a central vertical passageway is formed in the center of the monopole 200 through the posts of the various modules. Typically the base section 260 is formed of steel.

As can be seen in FIG. 6, the base section 260 includes a window 264 in the side wall 262. In some embodiments, a reinforcing rim, braces or the like may be associated with the window 264 to combat a tendency of the base section 260 to buckle under loading. The window 264 may optionally be covered by a door (not shown).

Within the window 264 is mounted a cable distribution unit 270. The cable distribution unit 270 receives one or more trunk cables (not shown), which may include power conductors, optical fibers, or both, and breaks them out into multiple cables that are routed to the RRUs of the monopole. In the illustrated embodiment, the cable distribution unit 270 includes a power distribution unit 272 and a fiber distribution unit 274, although in some embodiments one of these distribution units may be omitted, and in other embodiments the power and fiber distribution units 272, 274 may be combined in a single assembly. One or more trunk cables are routed to the power and fiber distribution units 272, 274, and power and/or fiber cables are routed from the power and fiber distribution units 272, 274 to the RRUs 130, 142 of the radio modules 120, 140. From there jumper cables are routed to the antennas 110 of the antenna modules 100, 100'.

In some embodiments, cables may be routed from the cable distribution unit 270 in the base section 260 to the radio modules 120, 140 through the empty interior passageways within the posts 128 (and similar posts in the other modules) into the appropriate modules. In such a configuration, the posts of the various modules would have access holes, slots or the like to enable cables to be routed from the base section 260 to the RRUs 130 and from the RRUs 130 to the antennas 110. As an example, a trunk cable may be routed from the ground into the base section 260 to the power and fiber distribution units 272, 274. Jumper cables may be routed from the power and fiber distribution units 272, 274 within the cable distribution unit 270 into the post of the base section 260 and to the radio modules 140, 120, 120' for interconnection with the RRUs 142, 130. Additional jumper cables may then be routed from the RRUs 130 into the post 128, then up to the appropriate antenna modules 100, 100' for interconnection with the antennas 110.

Alternatively, jumper cables can be routed from the base section 260 or from one of the radio modules 120, 140 to additional modules through routing holes in the ceilings and floors of the various modules and the base section 260.

The foregoing demonstrates that the monopole 200 capitalizes on the otherwise unused empty space within the base section 260 to house the cable distribution unit 270. The use of the space within the base section 260 can free up other portions of the monopole 200 to provide other functions, or can simply enable a less expensive "spacer" module to be employed instead of a separate cable distribution unit.

Those skilled in this art will also appreciate that the use of a base section 260 that houses a cable distribution unit 270 may also be employed with a standard (i.e., non-modular) monopole, or a two-piece monopole that includes a separate base section and a single upper piece on or in which the remaining components are mounted.

Figure 7:
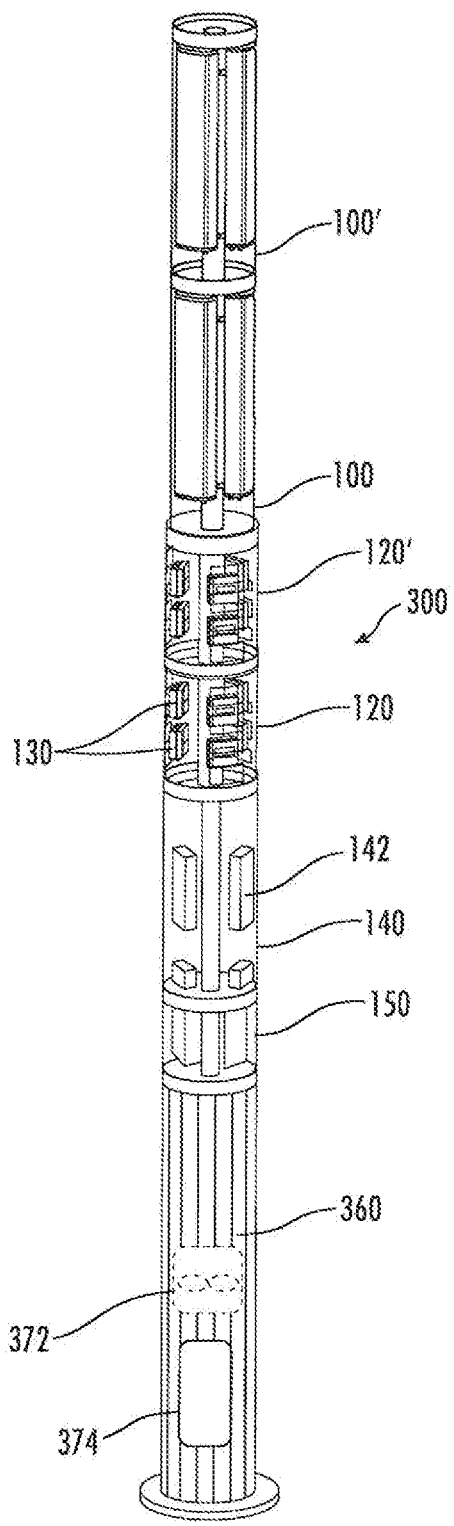
FIG. 7 is a front view of a modular monopole according to embodiments of the invention.
Figure 8:
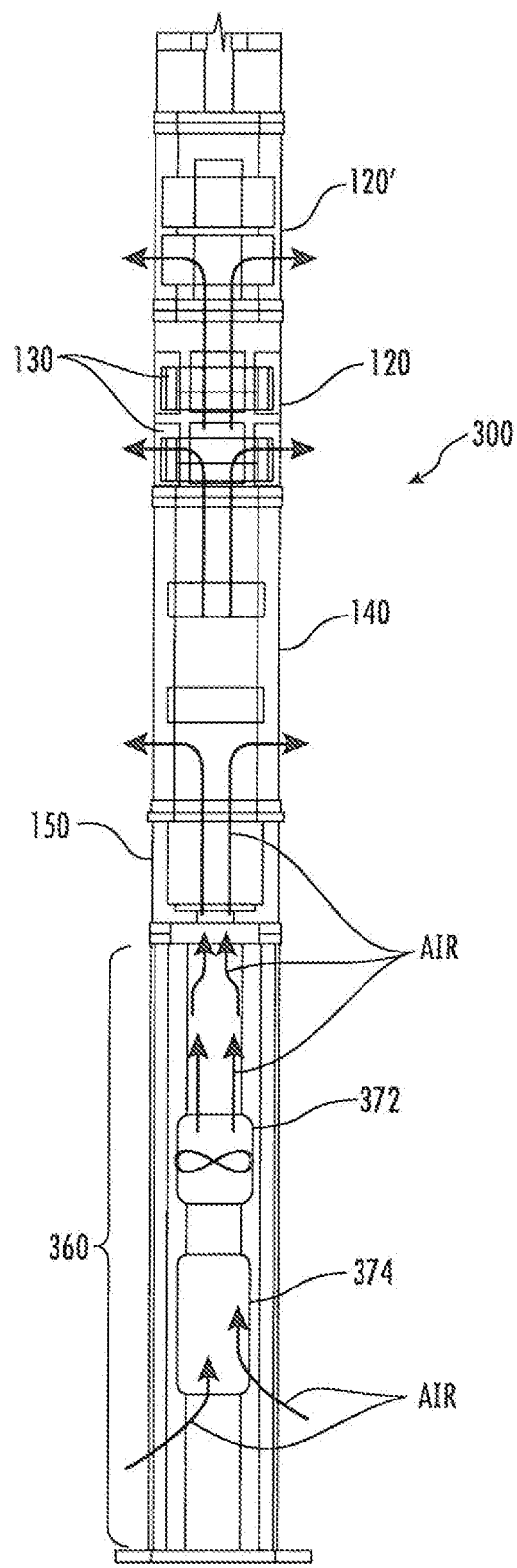
FIG. 8 is a schematic diagram of a portion of a modular monopole according to embodiments of the invention.
Figure 9:
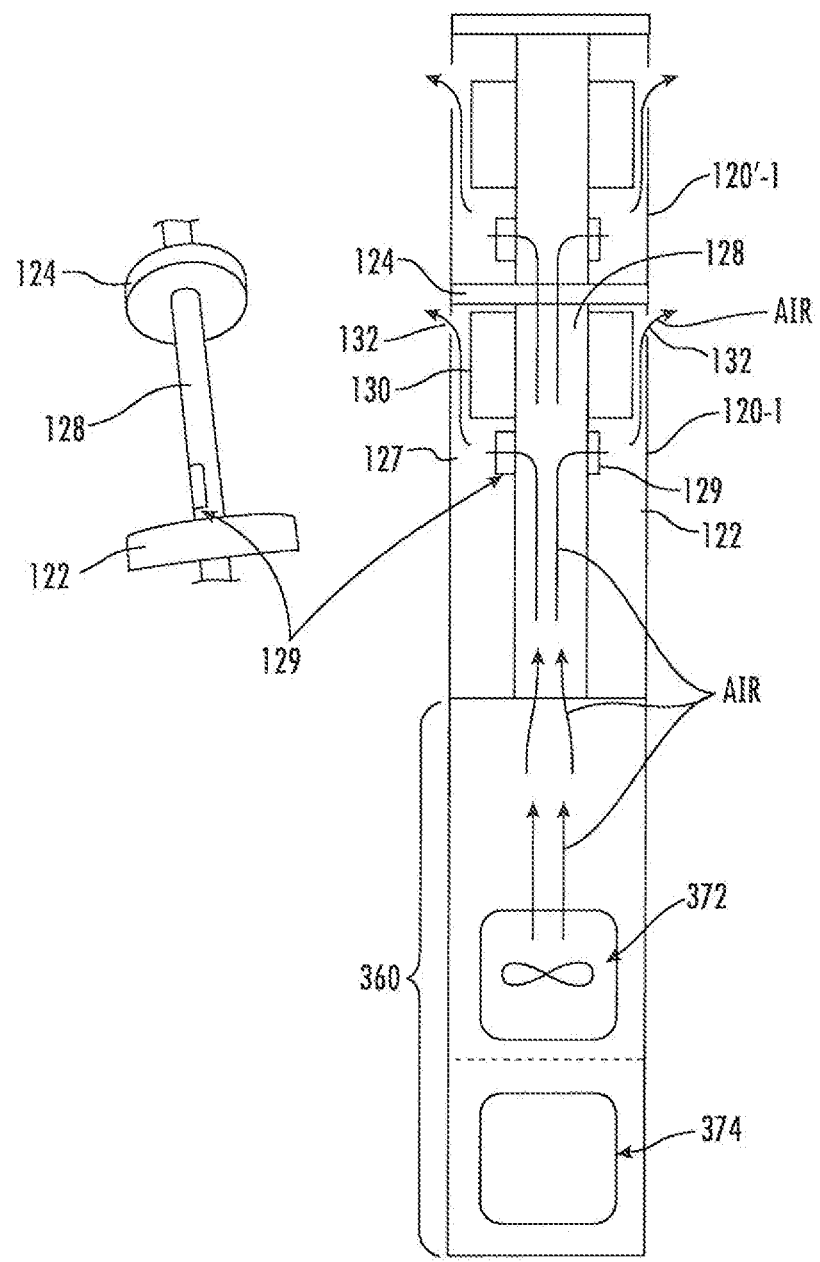
FIG. 9 is a schematic diagram of a portion of a modular monopole and a radio module frame according to embodiments of the invention.

Referring now to FIGS. 7-9, a modular monopole, designated broadly at 300, is shown therein. Like the monopoles 50, 200, the monopole 300 is constructed of individual sections, including one or more antenna modules and one or more radio modules, along with optional additional sections. The exemplary monopole 300 shown in FIG. 7 includes two antenna modules 100, 100' stacked vertically at the top of the monopole 300, two radio modules 120, 120' stacked vertically immediately below the antenna modules 100, 100', another radio module 140 of a different type and size, below the radio modules 120, 120', a distribution module 150, and a base section 360 is located below the radio module 140. The antenna modules 100, 100', radio modules 120, 120', 140 and distribution module 150 are as described above. The base 360 is located below the distribution module 150 and serves as a foundation for the monopole 300.

When the RRUs 130, 142 are being operated, the RRUs 130, 142 generate heat and heat air in the radio modules 120, 120', 140. To cool down the RRUs 130, 142, an air conveying unit 372 and an air intake section 374 are provided in the base 360. In some embodiments, the air intake section 374 may be below the air conveying unit 372 as illustrated in FIG. 7. The air conveying unit 372 may be concealed in the base 360 and may not be visible from outside. In some embodiments, the air conveying unit 372 may be a fan. The air intake section 374, which may be perforated or a fully open section, may define an outer side wall of the base 360 and may be visible from outside.

Referring to FIG. 8, cool air (e.g., outside air) may enter the base 360 through the air intake section 374. The air conveying unit 372 may force cool air up through the distribution module 150, the radio module 140, and the radio modules 120, 120', and cool air may exhaust from the radio modules 120, 120', 140 as represented by arrows in FIG. 8.

The distribution module 150, the radio module 140, and the radio modules 120, 120' may be arranged to allow air flow through those modules.

For example, each of the hollow posts 128 of the radio modules 120, 120', 140 may include an opening 129, which allows air (e.g., cool air) to flow from the hollow post 128 to the radio compartment 127. As illustrated in FIG. 9, in some embodiments, the opening 129 may be closer to the floor 122 than the ceiling 124 such that air vertically flows in the radio compartment 127 and cools down the RRUs 130. In some embodiments, the hollow post 128 may include two or more openings 129. Air heated by the RRUs 130 may be vented through the vents 132.

Multiple of these concepts are included in a telecommunications monopole designated at 400 and shown in FIGS. 10-15. As can be seen in FIG. 10, the monopole 400, which is sized as a "metrocell" having a diameter of between about 10 to 20 inches and a height of between about 20 and 40 feet, is styled as a streetlight, with a power module 450 at the base, equipment modules 420, 520, 620, and an antenna module 410 at the top of the pole 400. In this embodiment, a luminaire mounting section 480 having an arm 482 that mounts a luminaire 484 (such as an LED streetlight) is also included, but may be absent in other embodiments.

Figure 12:
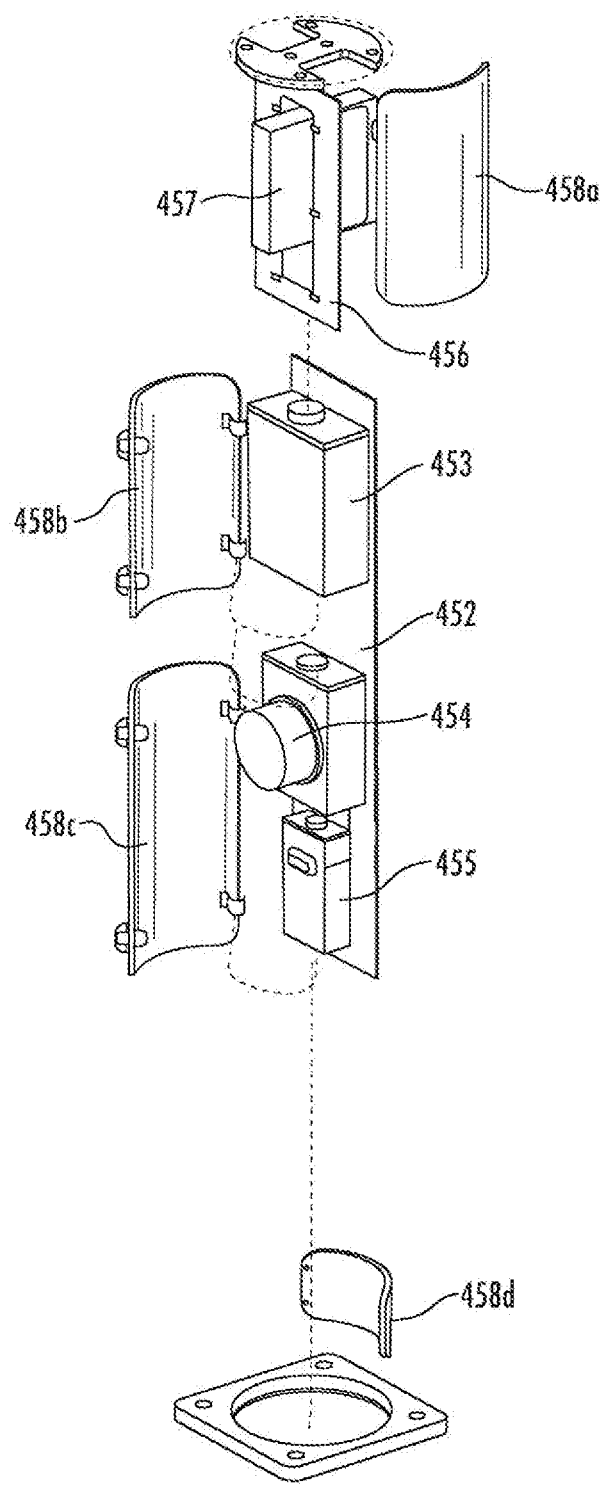
FIG. 12 is a perspective view of an equipment module of the pole of FIG. 10.

Referring now to FIGS. 10 and 12, the power module 450 includes an outer shell 451 within which is mounted a mounting panel 452. An AC load center 453, a power meter 454, and a main disconnect unit 455 are mounted on the mounting panel 451. A second mounting panel 456 is mounted within the outer shell 451, on which is mounted a service aggregation router 457. Access doors 458a, 458b, 458c, 458d are attached to the outer shell 451 to provide access to the various equipment located inside the shell 451.

Figure 13:
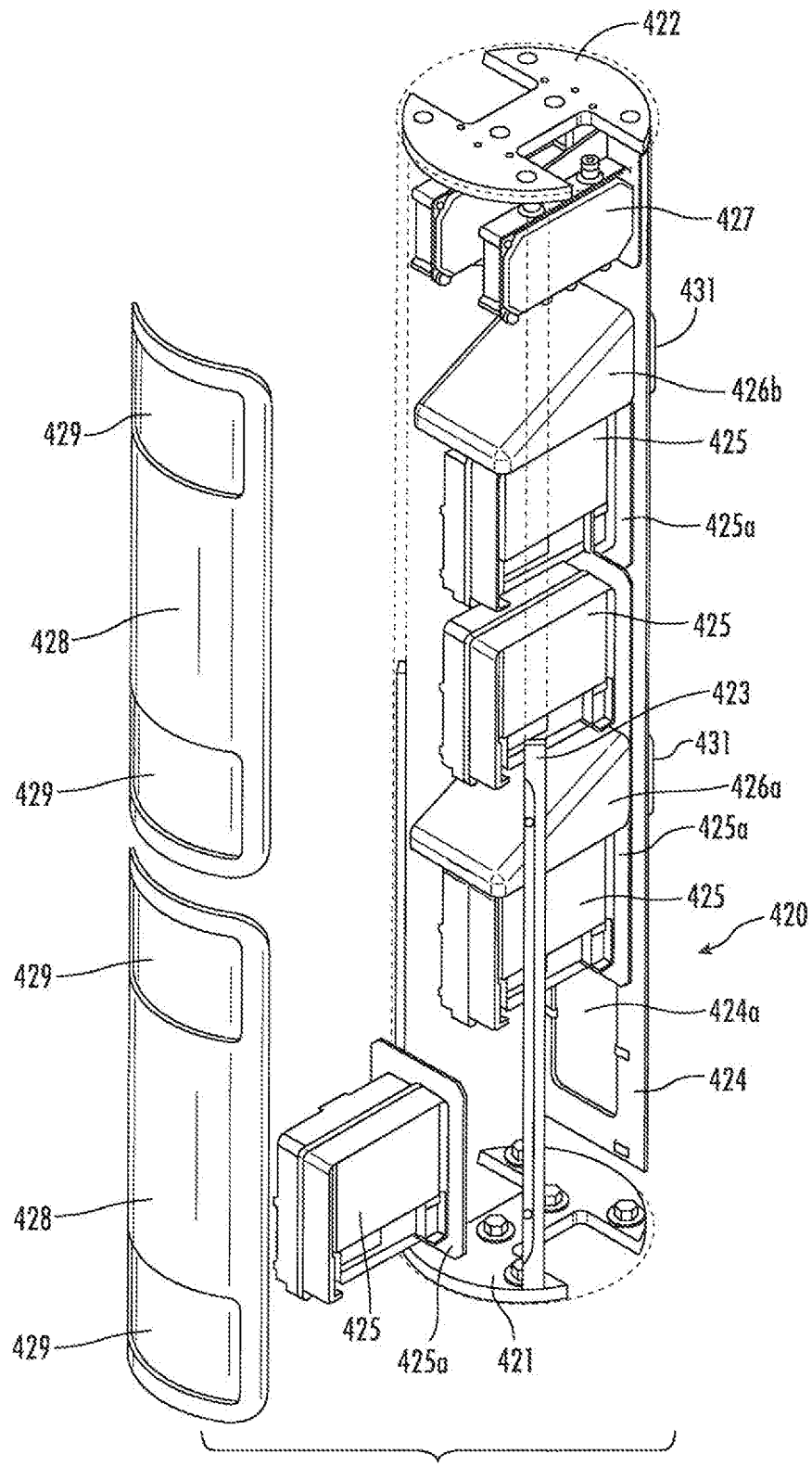
FIG. 13 is an exploded perspective view of the equipment module of FIG. 12.

Referring now to FIGS. 11 and 13, the equipment module 420 includes a floor 421 and a ceiling 422 spanned by uprights 423. A mounting panel 424 with an opening 424a extends most of the length of the module 420. Four RRUs 425 are mounted to the mounting panel via three different mounting rims 425a, which enable the RRUs to be mounted perpendicularly to the mounting panel 424. A diplexer 427 is mounted to the mounting panel above the RRUs 425 near the ceiling 422.

Two angled cooling baffles 426a, 426b are mounted to the mounting panel 424: the baffle 426a is mounted above the two lowermost RRUs 425, and the baffle 426b is mounted above the two uppermost RRUs 425 and below the diplexer 427. Two doors 428 are mounted to the outer shell 430. Each of the doors 428 includes two perforated sections 429 near its end sections. In addition, the outer shell 430 includes two perforated sections 431, each positioned below the upper surface of a respective baffle 426a, 426 and located diametrically opposed to perforated sections 429.

In this configuration, air flow is directed to provide cooling to the RRUs 425. As an example, external air entering the lowermost perforated section 429 flows upwardly over the two RRUs 425 to cool them, then is directed by the lower baffle 426a out of the perforated section 431. External air can also enter the two "center" perforated sections 429, flow upwardly to cool the two uppermost RRUs 425, and exit the upper perforated section 431 (directed by the upper baffle 426). Further, external air can enter the uppermost perforated section 429, cool the diplexer 427, and exit the upper perforated section 431. Thus, this arrangement enables external air to cool the various RRUs 425. Notably, the "exit" perforated sections 431 are located on the opposite side of the module 420 from the "entry" perforated sections 429.

Figure 14:
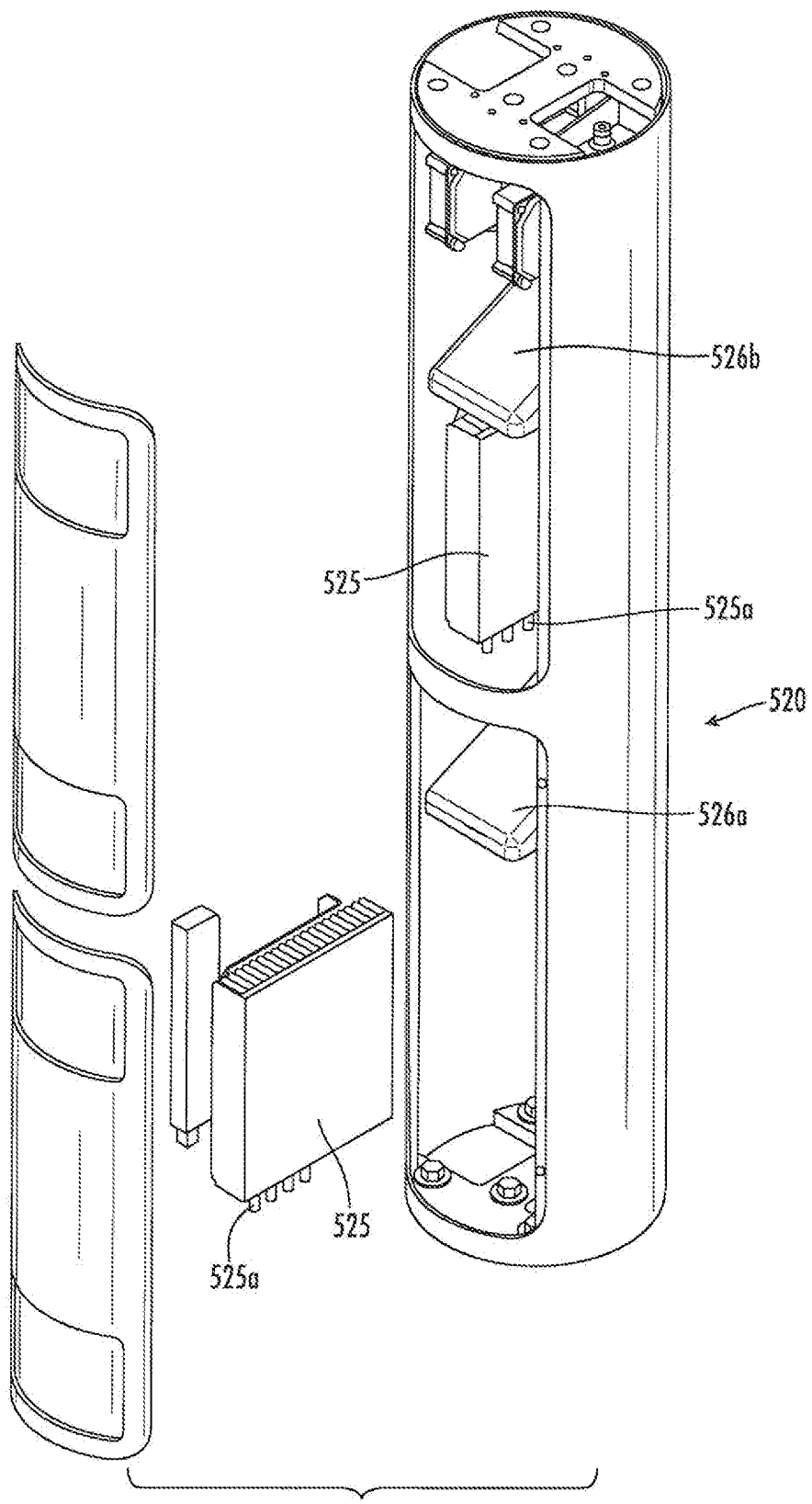
FIG. 14 is an exploded perspective view of an alternative equipment module of the pole of FIG. 10.

Referring now to FIGS. 10 and 14, the equipment module 520 is illustrated therein. The equipment module 520 is similar to the equipment module 420, with the exception that only two RRUs 525 (which are of a different size and configuration) are mounted within the module 520, each beneath one of the baffles 526a, 526b. It can also be seen in FIG. 13 that connectors 525a on the RRUs 525 are on the underside of each RRU 525, which can facilitate interconnection of cables to the RRU 525.

Figure 15:
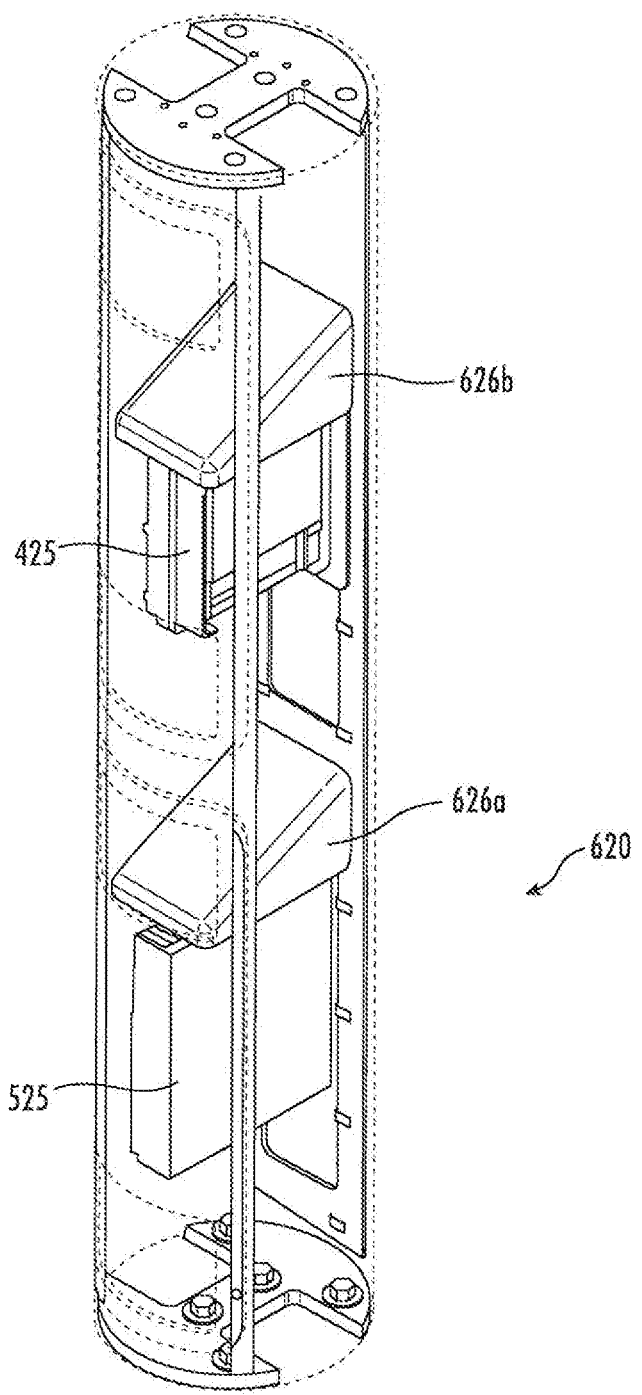
FIG. 15 is an exploded perspective view of yet another alternative equipment module of the pole of FIG. 10.

Referring now to FIGS. 10 and 15, the equipment module 620 is similar to the equipment modules 420, 520, with the exception that the module 620 includes one RRU 525 and one RRU 425 mounted therein. The baffles 626a, 626b are mounted as in the equipment modules 420, 520 and create similar air flow patterns.

Referring back to FIG. 10, the antenna module 410 includes a canister antenna (not visible in FIG. 10). An exemplary canister antenna is Model No. 4VPP-360s-F, available from CommScope, Inc. (Hickory, N.C.). Exemplary antennas are also discussed in U.S. Pat. No. 9,433,034, the disclosure of which is hereby incorporated herein by reference.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A modular monopole for wireless communications, comprising:
   an antenna module having a floor, a ceiling and a side wall that form an antenna compartment, wherein at least one antenna resides within the antenna compartment;
   a radio module having a floor, a ceiling and a side wall that form a radio compartment, wherein at least one remote radio unit (RRU) resides within the radio compartment; and
   a base;
   wherein the base, the radio module, and the antenna module are arranged in vertically stacked relationship, with the base below the radio module and the antenna module above the radio module;

wherein the antenna module includes a first hollow post that extends between the antenna module floor and the antenna module ceiling, and wherein the radio module includes a second hollow post that extends between the radio module floor and the radio module ceiling; and wherein one or both of the antenna module and the radio module comprises at least one rotational alignment feature configured to ensure rotational alignment of the antenna module and radio module relative to each other about a longitudinal axis of the vertically stacked antenna module and radio module.

2. The modular monopole defined in claim 1, wherein each of the antenna module, the radio module, and the base is cylindrical and has a diameter, and wherein each of the diameters of the antenna module, the radio module and the base is substantially identical.

3. The modular monopole defined in claim 1, further comprising a distribution module having a distribution compartment, wherein at least one cable distribution unit resides within the distribution compartment, the cable distribution unit configured to receive power conductors and optical fibers from a trunk cable, and wherein the distribution module is in vertically stacked relationship with the base, the radio module and the antenna module.

4. The modular monopole defined in claim 3, wherein the distribution module is located between the base and the radio module.

5. The modular monopole defined in claim 3, wherein the distribution module is located in the base.

6. The monopole assembly defined in claim 4, wherein the base section is configured such that the cable distribution unit is mounted between about 6 and 15 feet above the ground.

7. The monopole assembly defined in claim 5, wherein a cable connecting the cable distribution unit with the RRU is routed within the monopole, wherein the base section of the monopole includes an access window.

8. The monopole assembly defined in claim 3, wherein the cable distribution unit is configured to receive optical fibers and power conductors.

9. The modular monopole defined in claim 1, wherein the at least one antenna is a plurality of antennas.

10. A modular monopole for wireless communications, comprising:
  an antenna module having a floor, a ceiling, a first hollow post connecting the floor and the ceiling, and a side wall that form an antenna compartment, wherein at least one antenna resides within the antenna compartment;
  a radio module having a radio module floor, a radio module ceiling and a side wall that form a radio compartment, wherein at least one remote radio unit (RRU) resides within the radio compartment; and
  a base;
  wherein the base, the radio module, and the antenna module are arranged in vertically stacked relationship, with the base below the radio module and the antenna module above the radio module;
  further comprising a cooling module in the base;
  wherein the radio module includes a second hollow post connecting the radio module floor and the radio module ceiling, the second hollow post including an opening, the opening in the second hollow post in fluid communication with the cooling module, wherein the opening in the second hollow post is located within the radio module between the radio module floor and the radio module ceiling and is closer to the radio module floor than the radio module ceiling such that air flows vertically in the radio module, and further comprising at least one vent in the radio module side wall adjacent the radio module ceiling.

11. The monopole assembly defined in claim 10, wherein the cooling module includes a fan and an air intake section.

12. The modular monopole defined in claim 10, wherein an air conveying unit is located in the base and configured to force air upwardly through the second hollow post.

13. A modular monopole for wireless communications, comprising:
  an antenna module having a floor, a ceiling and a side wall that form an antenna compartment, wherein at least one antenna resides within the antenna compartment;
  a radio module having a floor, a ceiling and a side wall that form a radio compartment, wherein a mounting panel is positioned within the radio compartment and extends most of a length of the radio compartment, wherein a first remote radio unit (RRU) and a second RRU are mounted to the mounting panel such that the second RRU is positioned above the first RRU; and
  a base;
  wherein the base, the radio module, and the antenna module are arranged in vertically stacked relationship, with the base below the radio module and the antenna module above the radio module;
  wherein the radio module includes:
    a first intake section in the radio module side wall;
    a second intake section in the radio module side wall, the second intake section being above the first intake section;
    a first exit section in the radio module side wall, the first exit section being above the first intake section;
    a second exit section in the radio module side wall, the second exit section being above the second intake section;
    a first angled baffle positioned within the radio compartment that is in fluid communication with the first intake section and the first exit section and that directs air that enters the radio module through the first intake section to exit the radio module through the first exit section; and
    a second angled baffle positioned within the radio compartment that is in fluid communication with the second intake section and the second exit section and that directs air that enters the second radio module through the second intake section to exit the second radio module through the second exit section;
  wherein the first and second exit sections are located on a side of the radio module side wall opposite the first and second intake sections.

14. The modular monopole defined in claim 13, wherein the side wall of the radio module includes a door, and wherein the first and second intake sections are located in the door.

\* \* \* \* \*